United States Patent [19]

Walker

[11] 4,399,965
[45] Aug. 23, 1983

[54] STRESS PANEL REPAIR INSERT FOR AIRCRAFT

[76] Inventor: Ned W. Walker, 35 Franklin Rd., Newport News, Va. 23601

[21] Appl. No.: 213,689

[22] Filed: Dec. 5, 1980

[51] Int. Cl.³ .............................................. B64C 1/14
[52] U.S. Cl. .................................... 244/129.4; 49/463; 244/1 R; 244/117 R; 244/119; 244/121
[58] Field of Search ................... 244/1 R, 117 R, 119, 244/120, 121, 123, 129.1, 129.4; 114/227, 228, 229; 49/463, 465, 57, 63, 125; 220/233, 234, 305

[56] References Cited

U.S. PATENT DOCUMENTS

| Re. 28,756 | 4/1976 | Fork | 49/465 |
| 2,392,835 | 1/1946 | Conlon | 244/129.4 |
| 2,744,382 | 5/1956 | Sokol et al. | 244/53 B |
| 2,959,671 | 11/1960 | Stevinson | 244/138 R |
| 3,305,196 | 2/1967 | Hanlon | 244/123 |
| 3,692,084 | 9/1972 | Irvine | 49/465 |
| 4,290,568 | 9/1981 | Vollmoeller | 244/1 R |

FOREIGN PATENT DOCUMENTS 2729650 1/1979 Fed. Rep. of Germany ........ 49/463

Primary Examiner—Charles E. Frankfort
Attorney, Agent, or Firm—Harvey B. Jacobson

[57] ABSTRACT

A thick panel is provided constructed of resilient deformable material and of a plan, size and shape to be snugly received in an airframe opening formed by the removal of an airframe stress panel. The resilient panel is positionable within the airframe opening in a manner fully closing the latter against the entrance of foreign material into the interior of the airframe from the exterior thereof. The thick panel includes an outer surface provided with a peripheral rabbet formed therein whereby the outer margin of the thick panel may be received beneath the airframe outer skin portions disposed about and defining the opening in which the thick panel is received. Further, the outer surface of the thick panel includes a flexible coating of substantially fluid impervious material.

5 Claims, 4 Drawing Figures

STRESS PANEL REPAIR INSERT FOR AIRCRAFT

BACKGROUND OF THE INVENTION

When high performance aircraft such as a "TOMCAT" undergoes servicing, it is sometimes necessary to remove and service many of the removable stress panels of the airframe which are normally held in position by precision fitted flush fasteners. It is not only necessary to remove these stress panels for servicing components which may be supported therefrom, but also to renew the flush fasteners which secure the stress panels to the airframe.

When stress panels are removed for servicing or for replacement of the attaching fasteners thereof an opening is left in the airframe through which foreign materials may enter the airframe from the exterior thereof and considerable expense is experienced as a result of the extensive cleaning of the interior of the airframe which is necessary preparatory to replacement of the stress panel. In addition, if the stress panel is removed merely for the purpose of renewing the fasteners which secure the stress panel to the airframe, portions of the airframe must be precision drilled and the metal cuttings resulting from such drilling operations must be removed from the interior of the airframe at great expense prior to reinstallation of the stress panel and the attaching fasteners therefor.

Accordingly, a need exists for a replacement insert for airframe stress panel openings and which may be utilized to close the openings immediately subsequent to removal of a stress panel and retained in place closing the airframe opening even during repair operations involving precision drilling of the skin of the airframe about the opening in order to renew the fasteners to be used in reinstalling the airframe stress panel. To my knowledge, no insert panels of this type heretofore have been known.

BRIEF DESCRIPTION OF THE INVENTION

The panel insert of the instant invention is constructed of a resilient and deformable foam plastic material and, thus, may be readily inserted in an opening of an airframe formed as a result of removal of a stress panel portion of the airframe. The insert panel is to be constructed of various sizes and shapes in order to conform to the openings which will be left in an airframe as a result of the removal of various stress panels from the airframe and the insert panel is provided with an outer surface coating which is substantially fluid impervious. Further, the coating is of a distinctive and light reflective color whereby the presence of an inserted panel as opposed to the stress panel replaced by the insert panel may be readily observed by workmen moving over the surface of the aircraft. Further, the distinctive color of the outer surface coating of the insert panel insures that an aircraft will not be moved from the servicing area until all of the previously removed stress panels are replaced in the airframe thereof.

The main object of this invention is to provide an insert panel positionable in an airframe opening formed as a result of removal of a stress panel from the airframe.

Another object of this invention is to provide an insert panel in accordance with the preceding objects and constructed of resilient and deformable material so as to facilitate insertion of the insert panel within an associated opening.

Yet another object of this invention is to provide an insert panel provided with a liquid imperious flexible outer coating thereon.

A further object of this invention is to provide an insert panel in accordance with the preceding object and wherein the coating is of a distinctive and light reflective color.

Still another object of this invention is to provide an insert panel whose structional features will enable partial deflection of the panel in order to facilitate precision drilling of the airframe skin about the associated opening independent of the panel being removed from closing relationship in the opening.

A final object of this invention to be specifically enumerated herein is to provide an insert panel in accordance with the preceding objects and which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
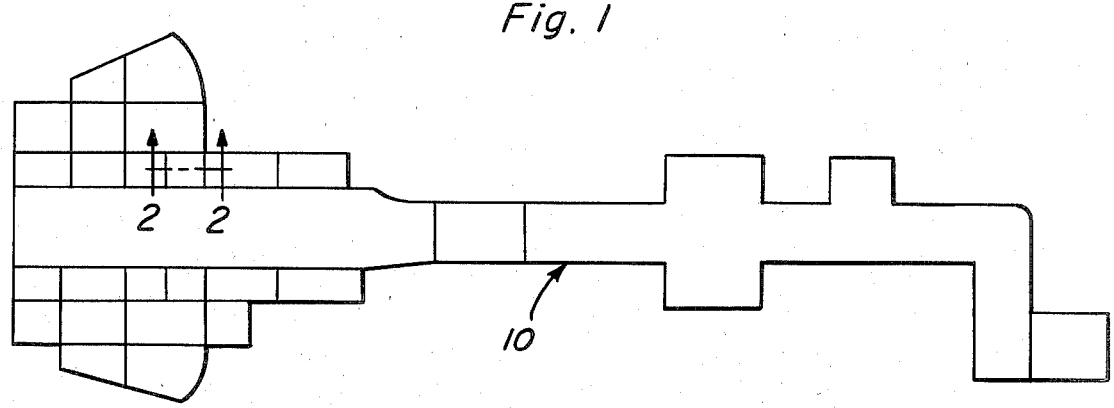
FIG. 1 is a plan layout of the stress panel locations of a typical airframe such as the "TOMCAT"

With reference now more specifically to FIG. 1 of the drawings, there may be seen a typical layout 10 of the positions of the stress panels found on the top, sides and bottom of an F-14 ("TOMCAT").

Figure 4:
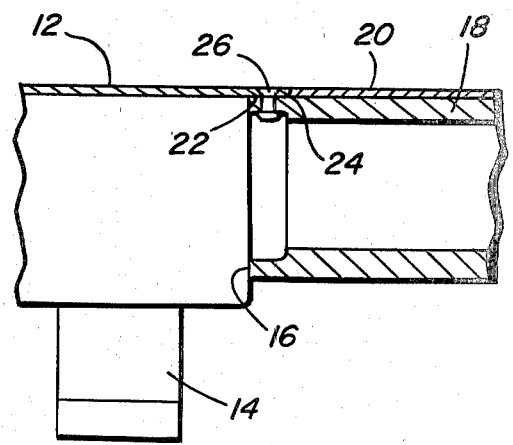
FIG. 4 comprises a fragmentary sectional view similar to FIG. 3 but illustrating the manner in which the previously removed stress panel may be reinstalled in the airframe opening.

In addition, FIG. 4 fragmentarily illustrates a stress panel including an operational electrical component 14 supported therefrom. The stress panel 12 is precision positioned within an opening 16 formed in the airframe 18. The airframe 18 includes an outer skin 20 having a rabbet 22 formed therein about the opening 16 and in which a marginal flange portion 24 of the stress panel 12 is recessed and secured through the utilization of a special flush fastener 26.

When the airframe 18 is being serviced, it is often necessary to remove one or more stress panels, either to renew the fasteners 26 or to replace or service the component 14. In the latter instance, the fasteners 26 might still be replaced. Also, when replacing the fasteners 26, the openings in the support structure 18 provided to receive the fasteners 26 therethrough are enlarged and subsequently filled with blanks (not shown) to be thereafter precision drilled through the utilization of a special positioning jig (not shown) supporting a drill bit 28. Precision secure reinstallation of the stress panels 12 on the airframe 18 is necessary inasmuch as the airframe is that of a high speed and high performance aircraft.

Once the stress panel 12 has been removed, foreign material may enter the interior of the airframe 18 from the exterior thereof. Further, the void defined by the opening 16 is dangerous to workmen moving over the aircraft and any metal cutting as a result of operation of the drill 28 may fall into the interior of the airframe 18. Inasmuch as the airframe 18 comprises a high speed and high performance aircraft, any such foreign material within the airframe 18 when it is returned to service is extremely dangerous and excessive man-hours must therefore be spent in order to clean the interior of the airframe and many employees are paid double time to effect these cleaning operations resulting in the overall cost of servicing the aircraft being greatly inflated.

In order to substantially reduce the "cleaning" costs, an insert panel referred to in general by the reference numeral 30 is provided. The insert panel is constructed of a resilient and deformable foam plastic material such as polyvinyl chloride. The panel 30 is constructed of a size and shape to be tightly received within the associated opening and includes inner and outer surfaces 32 and 34. Further, the outer surface 34 includes a peripherally extending rabbet 36 for recessing the outer marginal portion of the panel 32 beneath those marginal portions of the support structure 18 extending about the opening 16. Also, the outer surface 34 of the panel 30 includes a flexible substantially fluid impervious coating 38 thereover.

Figure 2:
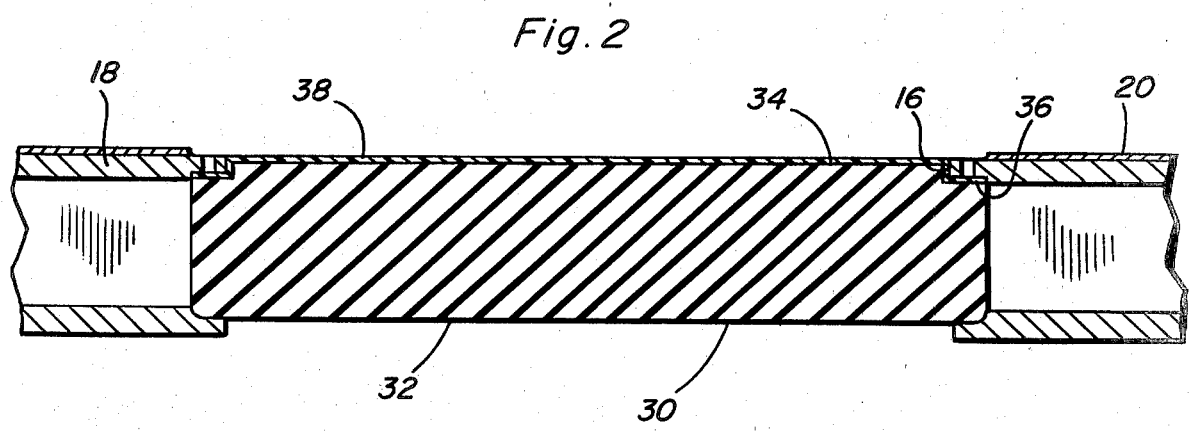
FIG. 2 is an enlarged fragmentary vertical sectional view illustrating an airframe section which has had a stress panel removed therefrom and an insert panel of the instant invention placed within the opening formed by removal of the stress panel.

The installation of the insert panel 30 in the opening 16 is illustrated in FIG. 2 of the drawings and it may be seen that the panel 30 completely fills the opening 16 against the entrance of foreign material into the interior of the airframe 18 from the exterior thereof. Also, the outer coating 38 is of a distinctive and higly light reflective color whereby its presence in the opening 16 will be readily viewable by workmen moving over the exterior of the airframe 18. Also, immediately prior to return of the aircraft to service, the distinctive color of the outer coating 38 will insure that the airplane is not returned to service while an insert panel 30 remains in place in lieu of the stress panel it replaces.

Figure 3:
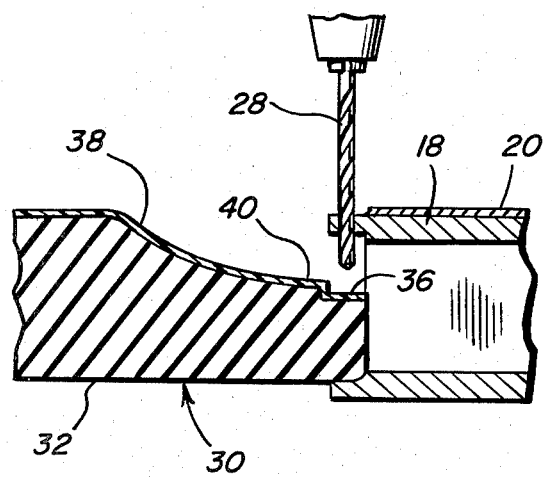
FIG. 3 is a fragmentary perspective view similar to the right hand portion of FIG. 2 but with the deformable insert panel partially compressed in an area thereof corresponding to the airframe skin marginal portion upon which a precision drilling operation is being performed from the exterior of the airframe.

Inasmuch as the panel insert is constructed of deformable material, successive marginal portions thereof may be inwardly depressed as indicated at 40 in FIG. 3 during the precision drilling operations for the purpose of renewing fasteners 36. In this manner, the metal cuttings which occur during the drilling operations are trapped outwardly of the outer surface coating 38 and readily may be vacuumed therefrom upon completion of the drilling operation immediately prior to removal of the insert panel and reinstallation of the stress panel 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with an aircraft airframe of the type including a stress panel receiving opening formed therein having reduced cross sectional area inner and outer ends and an intermediate portion of greater cross sectional area than said ends, an insert for said opening comprising a thick panel of resilient deformable material snugly removably received in said opening substantially entirely intermediate said inner and outer ends and with said inner and outer ends defining opposing surfaces between which said panel is received for resisting displacement of said panel from either said inner end or said outer end, said panel closing said opening intermediate said inner and outer ends against the entrance of foreign material into said airframe from the exterior thereof, said panel being sufficiently resiliently deformable whereby an outer surface portion thereof at a selected marginal area of said panel may be engaged and deflected inwardly away from the marginal portion of said airframe defining the corresponding portion of said reduced cross sectional area outer end of said opening, thereby enabling said airframe marginal portion to have machining operation performed thereon while said insert remains in position closing the inner end of said opening against the entrance of machining cuttings into the interior of said airframe and the intermediate portion of said opening to be vacuumed after the aforementioned machining operation is performed in order to vacuum away machining cuttings prior to removal of said panel.

2. The combination of claim 1 wherein said thick panel is constructed of foam-type cellular material and includes a peripheral rabbeted outer surface for positioning of said outer surface substantially flush with the outer surfaces of the portions of said airframe disposed about said reduced cross sectional area outer end of said opening, said outer surface including a flexible coating of substantially fluid impervious material thereover.

3. The combination of claim 2 wherein said coating is distinctively colored with a bright and light reflective color.

4. The combination of claim 2 wherein the peripheral margin of said outer surface includes the shallow rabbet formed therein for reception of said peripheral marginal portion beneath the airframe portions disposed about said opening.

5. The method of preventing the ingress of foreign material into the interior of an airframe from the exterior thereof through an opening in the airframe formed by the removal of a stress panel and wherein the opening includes reduced cross sectional area opposite inner and outer ends and an intermediate portion of greater cross sectional area than said opposite ends and at least one marginal portion of said airframe disposed about the outer end of said opening must have a machining operation performed thereon, said method comprising inserting a snugly fitting thick panel constructed of resilient deformable material and of a plan size and shape corresponding to the size and shape of the intermediate portion of the opening within said intermediate portion, whereby to close both the inner and outer ends as well as the immediate portion of the opening against the entrance of foreign material into the airframe from the exterior thereof, inwardly displacing an outer surface marginal portion of said thick panel corresponding to said one marginal portion of said airframe, performing the desired machining operation on said one marginal portion while the corresponding outer surface portion of said panel is deflected inwardly, vacuuming the intermediate portion of said opening in the area thereof corresponding to said one marginal portion while said outer surface portion is inwardly deflected away from said one marginal portion, and thereafter removing said thick panel through the one of the ends of said opening.

* * * * *